United States Patent [19]
Meikrantz et al.

[11] Patent Number: 5,591,340
[45] Date of Patent: Jan. 7, 1997

[54] CENTRIFUGAL SEPARATOR

[75] Inventors: David H. Meikrantz, Carson City, Nev.; Lawrence L. Macaluso, Reseda; H. William Sams, III, Simi Valley, both of Calif.; Charles H. Schardin, Jr., Carson City, Nev.; Alfred G. Federici, Newbury Park, Calif.

[73] Assignee: Costner Industries Nevada, Inc., Carson City, Nev.

[21] Appl. No.: 522,520

[22] Filed: Sep. 1, 1995

[51] Int. Cl.$^6$ .................................................. B01D 21/26
[52] U.S. Cl. .................................. 210/512.3; 210/360.1; 494/43; 494/56; 494/60; 494/80
[58] Field of Search ................................ 210/360.2, 369, 210/380.1, 381; 494/43, 56, 60, 65, 80

[56] References Cited

U.S. PATENT DOCUMENTS

| | | | |
|---|---|---|---|
| 2,474,006 | 6/1949 | Maycock | 366/305 |
| 2,474,007 | 6/1949 | Maycock | 366/305 |
| 3,424,312 | 1/1969 | Nyrop et al. | 210/380.1 |
| 3,674,196 | 7/1972 | Gutter | 494/22 |
| 4,786,480 | 11/1988 | Martin | 494/44 |
| 4,816,152 | 3/1989 | Kalleberg | 494/80 |
| 4,824,430 | 4/1989 | Kashihara et al. | 494/22 |
| 4,857,040 | 8/1989 | Kashihara et al. | 494/22 |
| 4,959,158 | 9/1990 | Meikrantz | 494/56 |
| 5,024,647 | 6/1991 | Jubin et al. | 494/43 |
| 5,149,432 | 9/1992 | Lavin . | |
| 5,254,075 | 10/1993 | Nemoto et al. | 494/65 |
| 5,254,076 | 10/1993 | Chow et al. | 494/63 |
| 5,267,936 | 12/1993 | Miachon . | |
| 5,387,342 | 2/1995 | Rogers et al. . | |

FOREIGN PATENT DOCUMENTS

1398915A2  5/1988  U.S.S.R. .

OTHER PUBLICATIONS

English Translation of SU 1398915 A2 May 30, 1988.

*Primary Examiner*—David A. Reifsnyder
*Attorney, Agent, or Firm*—Blakely, Sokoloff, Taylor & Zafman

[57] ABSTRACT

A centrifugal separator has a housing with a generally cylindrical inner surface defining an inner chamber. A hollow rotor is disposed within the chamber for rotation therein. At least one inlet is provided for introducing a liquid mixture into the annular volume between the rotor and the housing, where it is then directed into the rotor. An upper rotor assembly separates the liquid mixture by phase densities with the disparate components directed to respective outlets. In one embodiment of the invention, the upper rotor assembly includes an easily removable weir ring to facilitate "tuning" of the separation process. The rotor of the separator is mounted on a unitary rotor shaft that extends axially through the separation chamber to upper and lower bearing assemblies in the separator housing. The bottom surface of the housing, where the liquid mixture is directed from the annular mixing volume into the rotor, preferably includes a plurality of radial vanes that are curved in the direction of rotation of the rotor to assist in directing the liquid mixture with minimal turbulence. Collector rings for the separated components provided from the upper rotor assembly are preferably formed integrally in the wall of the housing with a smoothly contoured peripheral surface to reduce turbulence of the output streams.

8 Claims, 6 Drawing Sheets

CENTRIFUGAL SEPARATOR

BACKGROUND OF THE INVENTION

1. Field of the Invention

This invention relates generally to centrifugal separators for separating mixed liquids of different densities, and more particularly to an improved separator assembly for achieving higher separation efficiencies with a variety of process liquids.

2. Prior Art

Centrifugal devices are widely used for separating materials of different densities. Such devices have been found to provide a highly satisfactory method of separating liquids from one another based on different weight phases.

Separators, also referred to as extractors, can separate the individual components of a mixed component input stream, provided that the components remain in separate phases. In many instances, extraction may be facilitated with the use of a solvent that is injected into the device as a second input stream. In this case, the device is often referred to as a "contactor" since it brings the waste stream and the solvent stream into intimate contact. The solvent phase, together with the soluble specie(s), is then separated from the carrier phase by differentiation of the phase densities. Typically, the process liquids comprise a lighter (less dense) solvent or organic phase and a heavier aqueous phase, which are introduced into the centrifugal contactor through separate inlets that communicate with a mixing zone. The resulting liquid mixture then enters the rotor of the contactor where centrifugal force separates the heavier phase from the lighter phase by forcing the heavier phase to flow outwardly away from the rotational axis of the rotor and thereby displace the lighter phase closer to the rotational axis of the rotor. The two phases are then individually collected at the upper end of the rotor with the heavier phase exiting at a location adjacent to the outer periphery and the lighter phase exiting at a location adjacent to the rotational axis. Typically, one or both of the exiting phases is subjected to one or more subsequent stages of extraction such as by circulation through another contactor.

A method of centrifugally separating the components of a water-petroleum mixture is described in U.S. Pat. No. 4,959,158 issued to the first-named inventor of this application. The method described therein utilized a centrifugal contactor developed by the U.S. Department of Energy for the extraction of transuranic elements from radioactive waste streams at nuclear processing plants. It was discovered that this device could be advantageously employed for the separation of a water-petroleum mixture. The relatively small size of the device, however, limited the practical applications of the method due to the relatively low throughput. The contactor design did not lend itself to being scaled up in size due to the design of the rotor, which was suspended from the rotor shaft into the contactor chamber. Such design was dictated, in part, by the robotic access to the rotor required in nuclear waste processing applications. In a larger size, a contactor of the same design would be inoperable due to the lack of a lower support for the rotor.

A contactor of a similar design similar to that described above, also developed by the U.S. Department of Energy, is described in U.S. Pat. No. 5,024,647. This contactor also employs a suspended rotor design, which limits its useful size.

SUMMARY OF THE INVENTION

The present invention provides a centrifugal separator that achieves significantly higher separation throughputs and a broader range of applications than similar devices heretofore known in the art. The separator of the present invention is readily scaled in size in accordance with the throughput of process liquids desired. The separator comprises a housing having a generally cylindrical inner surface defining an interior chamber. A hollow rotor is disposed within the chamber for rotation therein, the rotor having upper and lower openings and a generally cylindrical rotor wall with an inner and an outer surface. The outer surface of the rotor wall is spaced apart from the inner surface of the housing and thereby defines an annular mixing volume. At least one inlet is provided for introducing a liquid mixture into the annular volume, which is in communication with the lower opening in the rotor. An upper rotor assembly separates the liquid mixture by phase densities with the disparate components directed to respective outlets. In one embodiment of the invention, the upper rotor assembly includes an easily removable weir ring to facilitate "tuning" of the separation process. This allows the separator to have application to a wide range of fluid densities. The rotor of the separator is mounted on a unitary rotor shaft that extends axially through the separation chamber to upper and lower bearing assemblies in the separator housing. The bottom surface of the housing, where the liquid mixture is directed from the annular mixing volume into the rotor, preferably includes a plurality of radial vanes that are curved in the direction of rotation of the rotor to assist in directing the liquid mixture with minimal turbulence. Collector rings for the separated components provided from the upper rotor assembly are preferably formed integrally in the wall of the housing with a smoothly contoured peripheral surface to reduce turbulence of the output streams.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
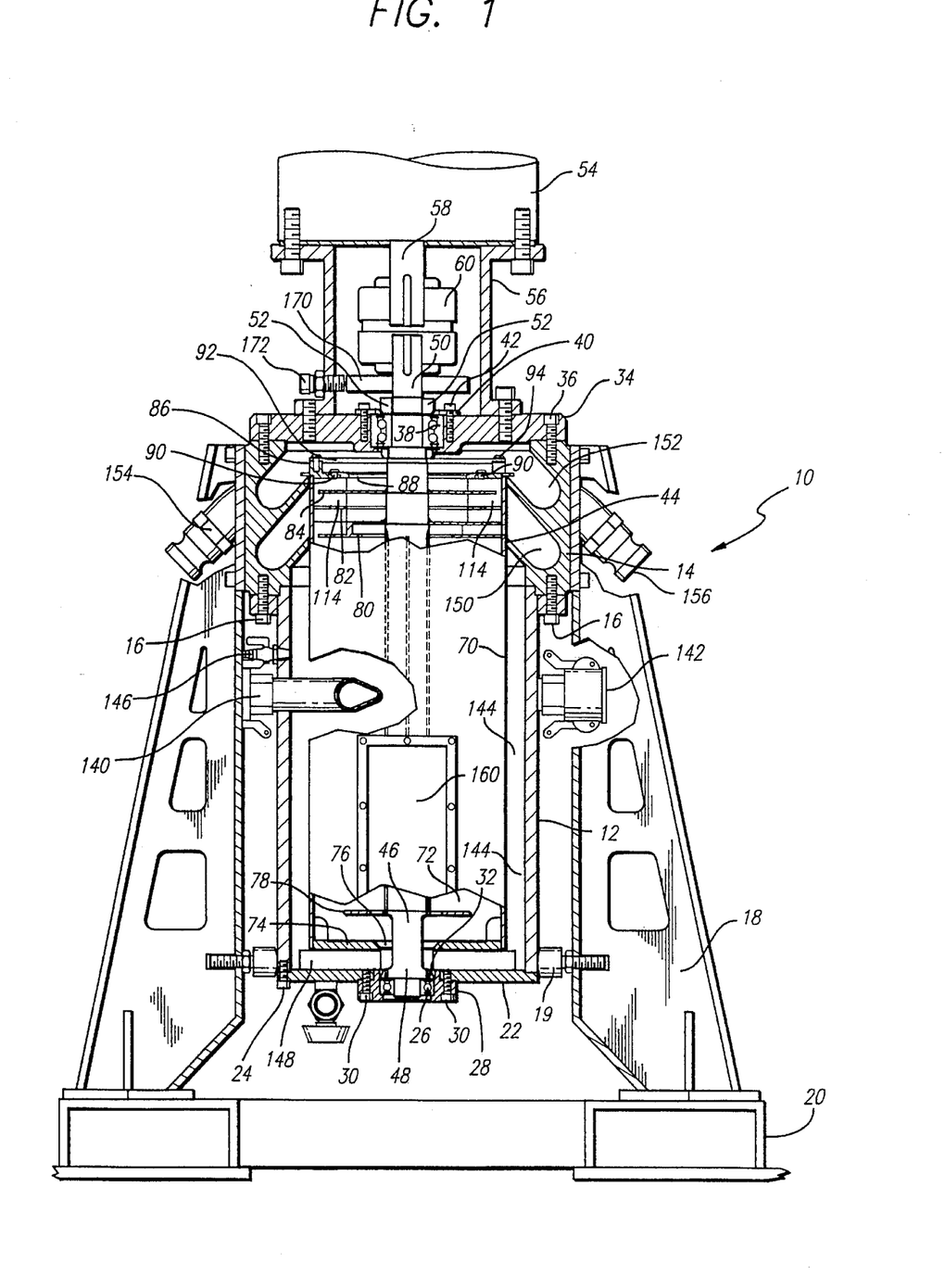
FIG. 1 is a cross-sectional view of a centrifugal separator constructed in accordance with the present invention.

FIG. 1 is a cross-sectional view of a separator 10 constructed in accordance with the present invention. It will be recognized that the general arrangement of the components is fairly typical for centrifugal separators known in the prior art. Therefore, details of the construction of the separator, apart from the particular subject matter of the present invention, will not be described herein at length.

The housing of separator 10 comprises a lower sleeve 12 and an upper sleeve 14 joined together by screws 16. Separator 10 is supported by legs 18, which are screwed or otherwise suitably fastened to upper sleeve 14. In the illustrated embodiment, separator 10 is supported by four such legs; however, the number of legs may be three or greater than four, if desired. Legs 18 rest on or are attached to base 20. Bumpers 19 on each of the legs bear against lower sleeve 12 to dampen precessional movement of the separator housing.

The design of separator 10 is such that it can be readily scaled up or down in size depending upon the desired flow rate. Substantially the same design as illustrated may be utilized for separators with diameters anywhere from 5 inches to 60 inches or more. Regardless of the diameter of the rotor, it is preferable to preserve a height to diameter ratio of approximately 2.4.

Bottom plate 22 is secured to the bottom of lower sleeve 12 with screws 24. Bottom bearing 26 is held in place by bearing cap 28 which is secured to bottom plate 22 by screws 30. Bearing 26 is protected from contamination by liquids contained within lower sleeve 12 by means of oil seal 32.

Upper bearing housing 34 is secured to the top of upper sleeve 14 by screws 36. Upper bearing 38 is retained within housing 34 by means of bearing retainer plate 40. This is secured to bearing housing 34 by screws 42.

Rotor 44 is carried on shaft 46 within the separation chamber defined by lower sleeve 12 and upper sleeve 14. The bottom end 48 of shaft 46 is supported both axially and radially by bottom bearing 26. Shaft 44 extends through the entire separation chamber and is supported at its upper end 50 by upper bearing 38. The inner race of upper bearing 38 is retained on shaft 46 by locknut 52.

Rotor 44 is turned about the axis of shaft 46 by means of motor 54, which is mounted to upper bearing housing 34 by means of motor mount 56. Motor shaft 58 is coupled to the upper end 50 of shaft 46 by means of compliant coupling 60, which is keyed both to rotor shaft 46 and to motor shaft 58.

A toothed wheel 170 is coupled to the upper end 50 of rotor shaft 46. A proximity sensor 172 is installed in motor mount 56 for sensing rotation of toothed wheel 170. The output of proximity sensor 172 is coupled to control electronics (not shown) for regulating the speed of motor 54. Motor speed is selected as a function of the physical dimensions of separator 10 and the process liquids involved. In typical applications, such as separation of petroleum contaminants from water, the rotor speed is selected to achieve approximately 200–300 g's of centrifugal force. For a nominal 5 inch diameter separator, a rotor speed of approximately 1750 rpm is suitable.

Figures 2, 3:
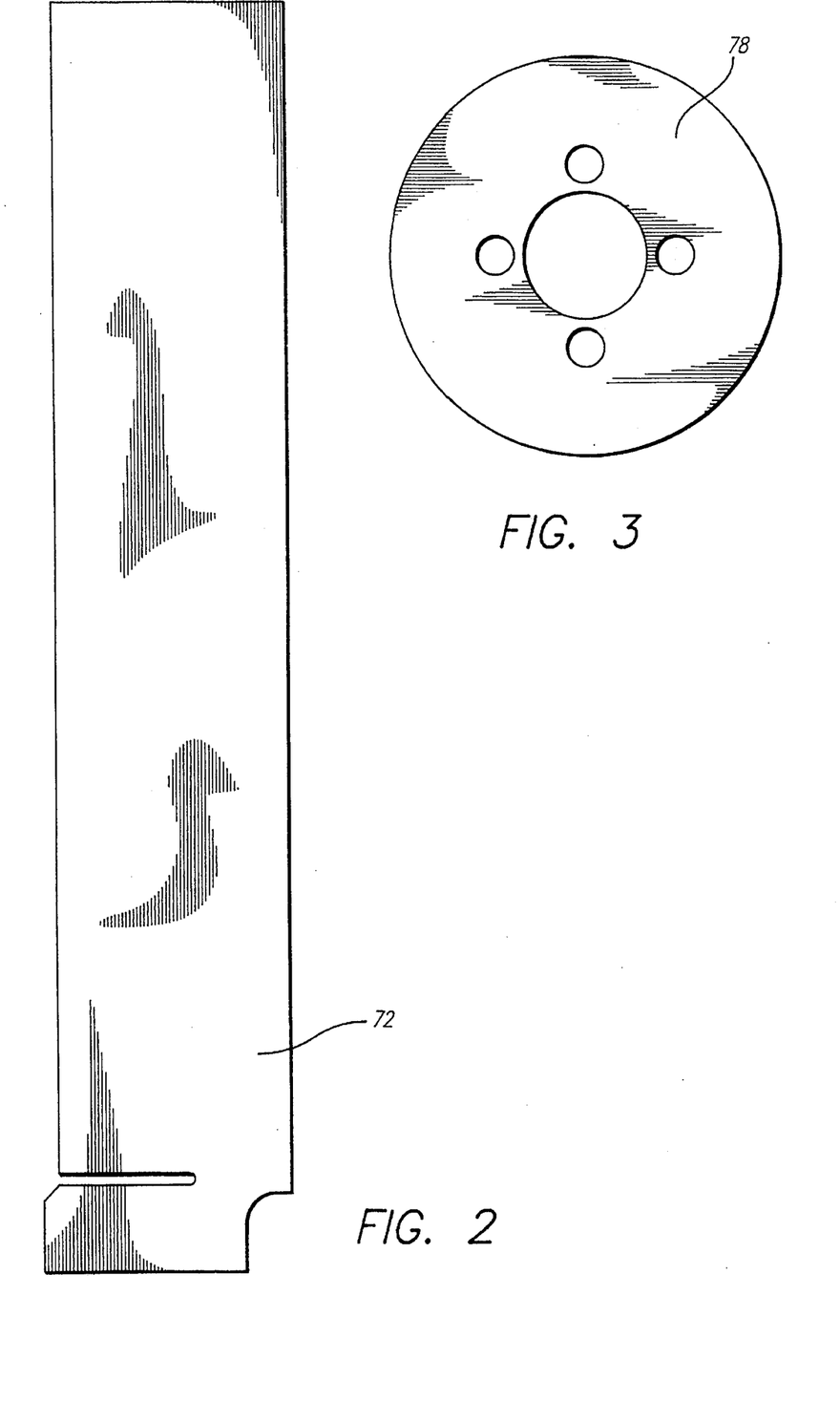
FIG. 2 illustrates one of the axial vanes used in the rotor of the separator illustrated in FIG. 1.
FIG. 3 illustrates a rotor diverter plate used in the separator illustrated in FIG. 1.

As mentioned above, rotor 44 is carried on shaft 46. The outer sleeve 70 of rotor 44 is supported on shaft 46, in part, by axial vanes 72, one of which is more clearly shown in FIG. 2. In the illustrated embodiment of separator 10, there are four such vanes, although any other suitable number of vanes could be employed. Rotor bottom 74 is attached to rotor sleeve 70 and has a central aperture defining an axial opening 76 around shaft 46 through which a liquid mixture is admitted to the interior of rotor 44. Diverter plate 78 is mounted on shaft 46 just above rotor bottom 74. A plan view of diverter plate 78 is shown in FIG. 3.

Figure 7:
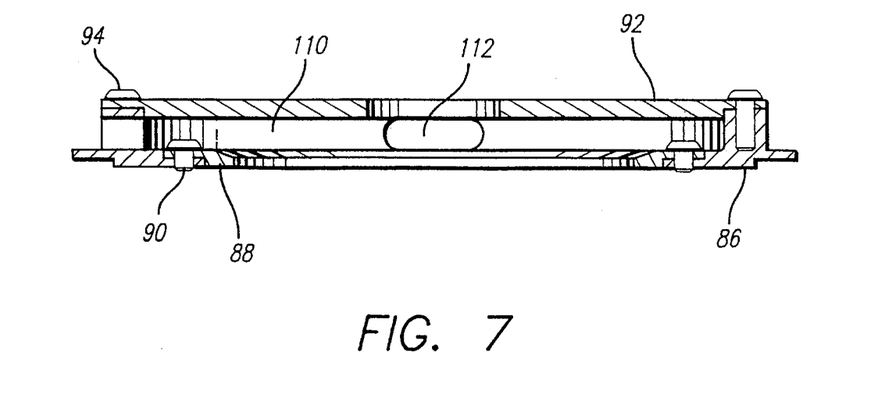
FIG. 7 illustrates a heavier phase slinger used in the separator of FIG. 1.

The top assembly of rotor 44, where phase separation occurs, comprises lighter phase slinger 80, weir plate 82, baffle plate 84 and heavier phase slinger 86. In one embodiment of the invention, the heavier phase weir 88 is secured to slinger 86 by screws 90. This allows the weir to be easily changed, a feature that is particularly useful for "tuning" separator 10 for a particular separation process. Small variations in the aperture diameter of weir 88 can have a dramatic effect on the efficiency of the separation process. Once the appropriate aperture diameter has been determined, the weir may be permanently secured to slinger 86. Alternatively, the weir may be machined integrally with slinger 86. In order to provide access to screws 90 and weir 88, a separate slinger cap 92 is provided. Slinger cap 92 is secured to slinger 86 by screws 94. Details of slinger 86 are shown in FIG. 7. With weir plate 88 and cap 92 in place, a chamber 110 is defined which communicates with outlet ports 112. In the case where the weir is formed integrally with the slinger, a separate slinger cap is not necessary and the heavier phase slinger may be constructed substantially like the lighter phase slinger 80.

Figure 4:
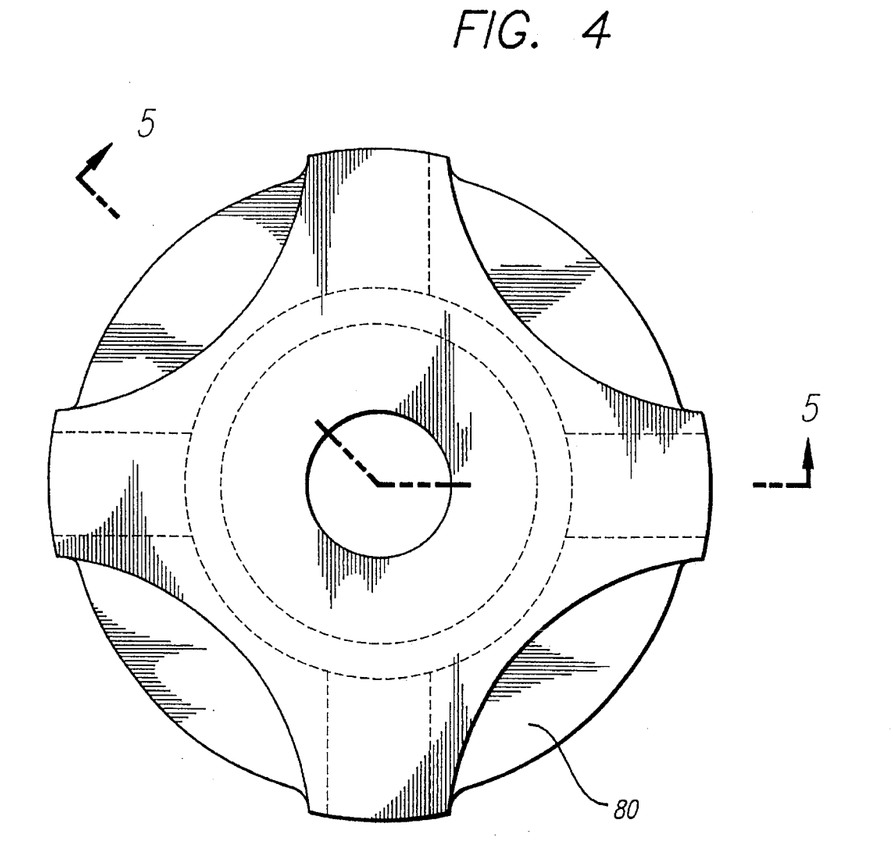
FIG. 4 is a plan view of a lighter phase slinger used in the separator of FIG. 1.
Figure 5:
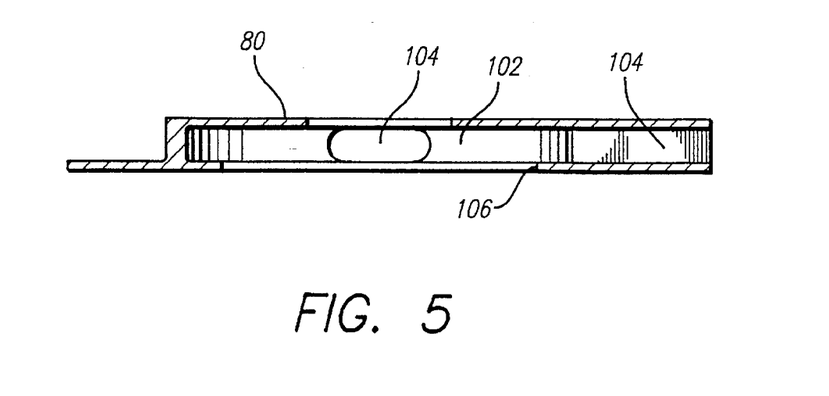
FIG. 5 is a cross-sectional view of the lighter phase slinger taken through line 5—5 of FIG. 4.

Details of lighter phase slinger 80 can be better seen in FIGS. 4 and 5. Slinger 80 comprises a hollow chamber 102 that communicates with outlet ports 104. Liquid is admitted into chamber 102 through the integral annular weir 106.

Figure 6:
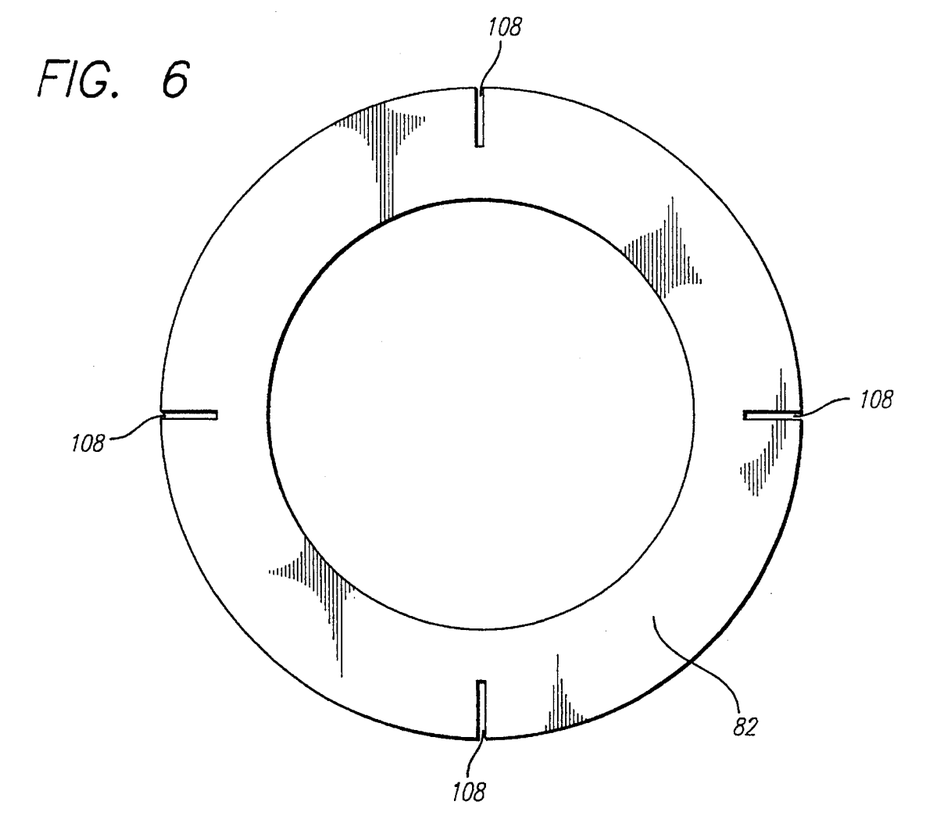
FIG. 6 illustrates a weir plate used in the separator of FIG. 1.

Details of weir plate 82 are shown in FIG. 6. This is simply an annular plate with slots 108 to receive radial baffles 114. Baffle plate 84 is simply a solid disk somewhat smaller in diameter than rotor sleeve 70 that fits over shaft 46 and is slotted in the same manner as weir plate 82 to receive radial baffles 114.

Figure 8:
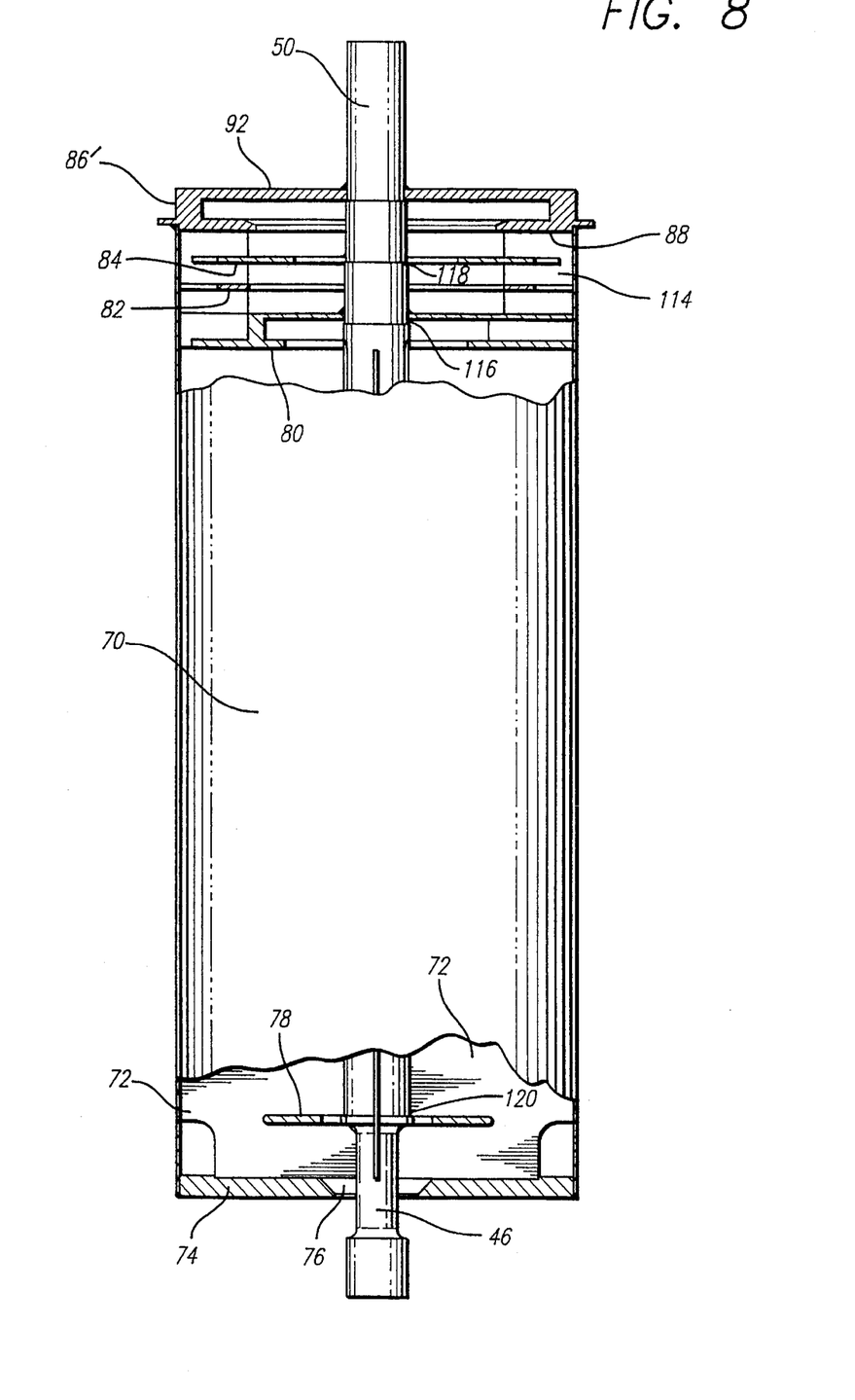
FIG. 8 is a partial cross-sectional view of a modified rotor assembly.

Referring now to FIG. 8, the components of rotor 44 are conveniently assembled with the following described process. First, organic slinger 80 is positioned on shaft 46 and welded thereto. To facilitate axial positioning of slinger 80, shaft 46 is preferably machined with a shoulder 116 to receive the slinger. Next, weir plate 82 is placed over the upper end of the rotor shaft. Baffle plate 84 is then placed over the rotor shaft and preferably abuts a second shoulder 118 machined on the shaft. Radial baffle plates 114 are then inserted into respective slots in weir plate 82 and baffle plate 84 where they are tack-welded in place. The axial baffles are aligned with the outlet ports in lighter phase slinger 80 and baffle plate 84 is then welded in place on shaft 46. Heavier phase slinger 86', shown here with an integral weir, is next placed over the shaft and the outlet ports are aligned with the radial baffles. The slinger is then welded to shaft 46, thereby completing the upper rotor assembly.

At the lower end of the rotor, diverter plate 78 is placed over shaft 46 against the shoulder 120. Axial vanes 72 are inserted into receiving grooves in shaft 46 and over diverter plate 78. Rotor bottom 74 is then installed against axial vanes 72 and clamped in place. The axial vanes are then tack-welded to the diverter plate and to the rotor shaft. The rotor bottom is then tack-welded to the axial vanes. Next the diverter plate is welded to the rotor shaft. After checking the alignment of all components, they are permanently welded in place. The internal components of rotor 44 are dynamically balanced by selectively removing material from the bottom surface of rotor bottom 74 adjacent to its outer periphery. Rotor sleeve 70 is then installed and welded to axial vanes 72. Sleeve 70 is also tack-welded to aqueous slinger 86 and to rotor bottom 74. After a final alignment check, rotor sleeve 70 is finish welded to slinger 86 and rotor bottom 74.

Referring again to FIG. 1, two inlet ports 140 and 142 are provided in lower sleeve 12 for admitting input streams to the annular mixing volume 144. Inlet ports 140 and 142 are symmetrically disposed and either one or both may be used for admitting the liquid mixture to be separated. An auxiliary inlet port 146 is provided for admitting a solvent in the case of a solvent-extraction process. Auxiliary inlet port 146 may also be used for introducing other separation agents, such as a surfactant, an emulsion breaker, etc. The rotation of rotor 44 ensures thorough mixing of the process liquids in annular mixing volume 144. An inspection window 160 is provided in the wall of lower sleeve 12 for visually examining the liquid mixture within annular mixing volume 144. The mixed components are guided by vanes 148 on bottom plate 22 into the interior of rotor 44 of axial opening 76. The liquid mixture is centrifugally separated according to phase density by the rotation of rotor 44. The heavier phase in the liquid mixture, typically an aqueous phase, is forced by centrifugal action against the wall of sleeve 70. This displaces the lighter phase, typically an organic phase, radially inwardly toward shaft 46. The lighter phase is admitted into chamber 102 of slinger 80 through weir 106. The lighter phase exits through outlet ports 104 into collector ring 150. The heavier phase continues upwardly past slinger 80 and is routed into slinger 86 where it is expelled through outlet ports 112 into collection ring 152. Collection rings 150 and 152 are formed as integral channels in upper sleeve 14 with smoothly curving peripheral walls. This construction contributes to lower turbulence of the output streams and facilitates a higher flow rate through the separator. Collector rings 150 and 152 communicate with respective outlet ports 154 and 156.

Figure 9:
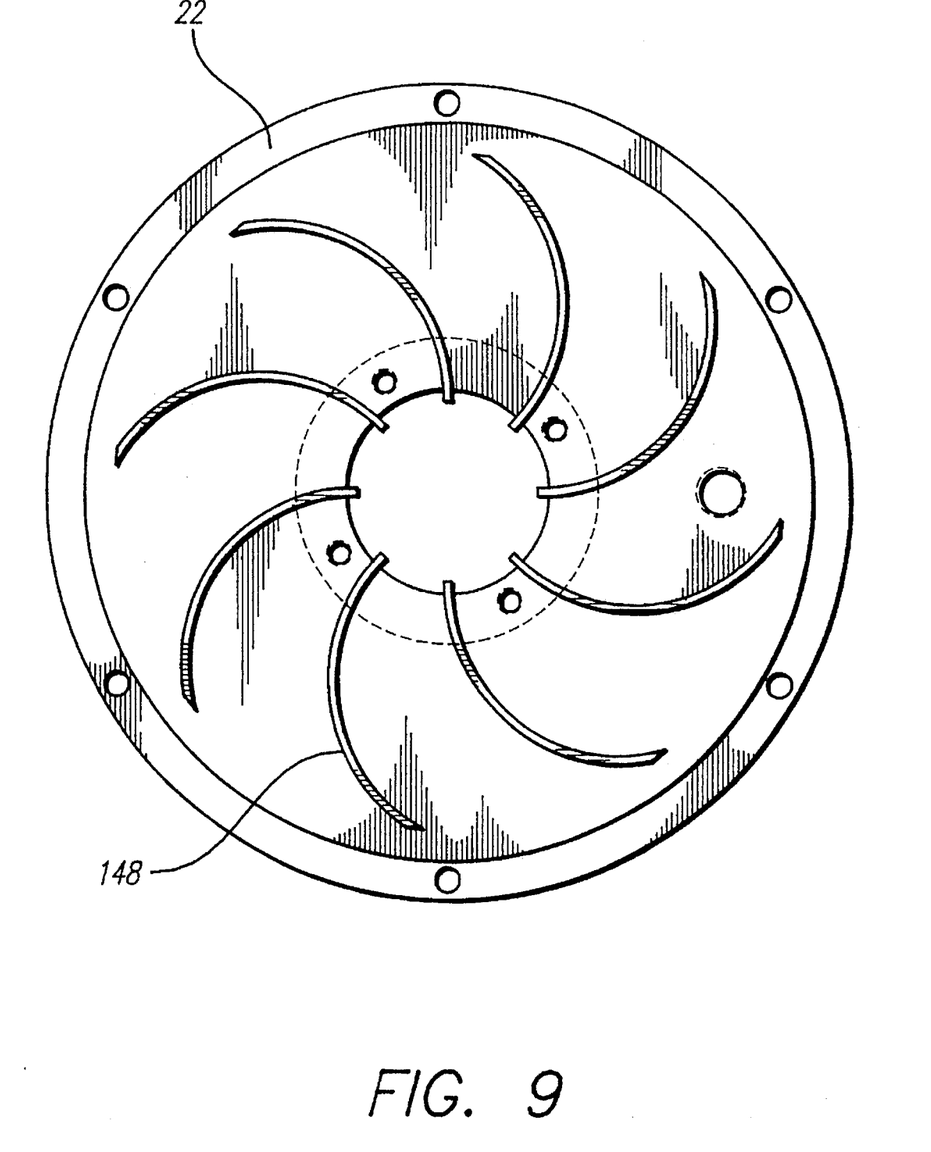
FIG. 9 is a plan view of the bottom plate of the separator shown in FIG. 1.

FIG. 9 is a plan view of bottom plate 22 showing the preferred configuration of vanes 148. The vanes are curved in the direction of rotation of rotor 44. Curving the vanes in this fashion has the effect of directing the liquid mixture towards axial opening 76 with significantly less turbulence than typically occurs with the straight radial vanes of prior art separators. Vanes 148 are preferably formed integrally with bottom plate 22 by casting or machining. However, vanes 148 may also be formed separately and subsequently attached to bottom plate 22 by welding or other suitable means.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A centrifugal separator comprising:

a housing having a generally cylindrical inner surface defining an interior chamber, said inner surface symmetrically disposed about an axis;

a hollow rotor disposed within said chamber for rotation about the axis, said rotor having upper and lower openings and a generally cylindrical rotor wall with an inner and an outer surface, said outer surface of the rotor wall spaced apart from the inner surface of the housing and defining an annular volume therebetween, said lower opening in the rotor in communication with the annular volume;

at least one inlet for introducing a liquid mixture having a density into the annular volume; and separation means disposed adjacent to the upper opening of the rotor for directing a first component of the liquid mixture having a density greater than the mixture's density to a first outlet and for directing a second component of the liquid mixture having a density less than the mixture's density to a second outlet, wherein said separation means includes an upper rotor assembly comprising a fixed weir ring and a removable weir ring axially spaced apart by a baffle assembly having a plurality of radial vanes.

2. The centrifugal separator of claim 1 wherein said separation means comprises a slinger assembly for the first component and wherein said removable weir ring is mounted on the slinger assembly.

3. The centrifugal separator of claim 2 wherein said slinger assembly comprises an annular plate having an upstanding circumferential wall, said removable weir ring mounted on said annular plate, and a cover plate removably secured to the circumferential wall.

4. A centrifugal separator comprising:

a housing having a generally cylindrical inner surface defining an interior chamber, said inner surface symmetrically disposed about an axis;

a hollow rotor disposed within said chamber for rotation about the axis, said rotor having upper and lower openings and a generally cylindrical rotor wall with an inner and an outer surface, said outer surface of the rotor wall spaced apart from the inner surface of the housing and defining an annular volume therebetween, said lower opening in the rotor in communication with the annular volume;

at least one inlet for introducing a liquid mixture having a density into the annular volume; and separation means disposed adjacent to the upper opening of the rotor for directing a first component of the liquid mixture having a density greater than the mixture's density to a first outlet and for directing a second component of the liquid mixture having a density less than the mixture's density to a second outlet, wherein said housing includes a bottom surface having a plurality of upstanding generally radial vanes disposed below the rotor and curved in a direction of rotation of the rotor for directing the liquid mixture from the annular volume to the lower opening of the rotor.

5. The centrifugal separator of claim 4 wherein the vanes are formed integrally with a bottom plate of the housing.

6. A centrifugal separator comprising:

a housing having a generally cylindrical inner surface defining an interior chamber, said inner surface symmetrically disposed about an axis;

a hollow rotor disposed within said chamber for rotation about the axis, said rotor having upper and lower openings and a generally cylindrical rotor wall with an inner and an outer surface, said outer surface of the rotor wall spaced apart from the inner surface of the housing and defining an annular volume therebetween, said lower opening in the rotor in communication with the annular volume;

at least one inlet for introducing a liquid mixture having a density into the annular volume;

separation means disposed adjacent to the upper opening of the rotor for directing a first component of the liquid mixture having a density greater than the mixture's density to a first outlet and for directing a second component of the liquid mixture having a density less than the mixture's density to a second outlet;

wherein said separator means includes a first component slinger having a first weir and a radial exit and wherein said separation means further includes a second component slinger, axially spaced apart from the first component slinger, having a second weir and a radial exit; and wherein said housing includes a first collector ring communicating with the first outlet and axially aligned with the radial exit of the first slinger for receiving the first component of the liquid mixture and a second collector ring communicating with the second outlet and axially aligned with the radial exit of the second slinger for receiving the second component of the liquid mixture and wherein each of said first and second collector rings have respective upper and lower annular walls inclined downwardly away from said axis and wherein the respective upper and lower annular walls are joined, in radial cross-section, by a smoothly curving peripheral wall.

7. The centrifugal separator of claim 6 wherein said first and second collector rings are formed integrally in an upper sleeve of the housing.

8. The centrifugal separator of claim 6 wherein said first weir is removably attached to said first slinger.

* * * * *